United States Patent
Mei et al.

(10) Patent No.: US 9,652,284 B2
(45) Date of Patent: May 16, 2017

(54) GPU DIVERGENCE BARRIER

(71) Applicant: QUALCOMM Incorporated, San Diego, CA (US)

(72) Inventors: Chunhui Mei, San Diego, CA (US); Alexei Vladimirovich Bourd, San Diego, CA (US); Lin Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 458 days.

(21) Appl. No.: 14/043,562

(22) Filed: Oct. 1, 2013

(65) Prior Publication Data

US 2015/0095914 A1    Apr. 2, 2015

(51) Int. Cl.
G06F 9/46    (2006.01)
G06F 9/48    (2006.01)
G06T 1/20    (2006.01)
G06F 9/52    (2006.01)
G06F 9/38    (2006.01)

(52) U.S. Cl.
CPC .......... *G06F 9/4843* (2013.01); *G06F 9/3887* (2013.01); *G06F 9/522* (2013.01); *G06T 1/20* (2013.01)

(58) Field of Classification Search
None
See application file for complete search history.

(56) References Cited

U.S. PATENT DOCUMENTS

| | | | |
|---|---|---|---|
| 7,480,840 B2 | 1/2009 | Hathorn et al. | |
| 7,522,167 B1 | 4/2009 | Diard et al. | |
| 7,639,252 B2 | 12/2009 | Goel | |
| 7,696,993 B2 | 4/2010 | Prokopenko et al. | |
| 7,746,347 B1 | 6/2010 | Brown et al. | |
| 8,072,460 B2 | 12/2011 | Lauterbach et al. | |
| 8,171,461 B1 | 5/2012 | Kilgard et al. | |
| 2007/0022428 A1 | 1/2007 | Yamasaki | |
| 2010/0064291 A1 | 3/2010 | Aila et al. | |
| 2011/0072248 A1 | 3/2011 | Nickolls et al. | |

(Continued)

OTHER PUBLICATIONS

Improving SIMT Efficiency of Global Rendering Algorithms with Architectural Support for Dynamic Micro-Kernels Michael Steffen and Joseph Zambreno Published: 2010.*

(Continued)

*Primary Examiner* — Emerson Puente
*Assistant Examiner* — Paul Mills
(74) *Attorney, Agent, or Firm* — Shumaker & Sieffert, P.A.

(57) ABSTRACT

A device includes a memory, and at least one programmable processor configured to determine, for each warp of a plurality of warps, whether a Boolean expression is true for a corresponding thread of each warp, pause execution of each warp having a corresponding thread for which the expression is true, determine a number of active threads for each of the plurality of warps for which the expression is true, sort the plurality of warps for which the expression is true based on the number of active threads in each of the plurality of warps, swap thread data of an active thread of a first warp of the plurality of warps with thread data of an inactive thread of a second warp of the plurality of warps, and resume execution of the at least one of the plurality of warps for which the expression is true.

28 Claims, 6 Drawing Sheets

(56) References Cited

U.S. PATENT DOCUMENTS

2011/0219221 A1 9/2011 Skadron et al.
2012/0079503 A1 3/2012 Dally et al.
2012/0204154 A1 8/2012 Li et al.
2013/0063464 A1 3/2013 Schneider et al.

OTHER PUBLICATIONS

Aila, et al., "Architecture Considerations for Tracing Incoherent Rays," Proceedings of the Conference on High Performance Graphics, Jun. 2010, pp. 113-122.
Fung W.W.L., "Dynamic Warp Formation: Exploiting Thread Scheduling for Efficient MIMD Control Flow on SIMD Graphics Hardware," ACM Transactions on Architecture and Code Optimization (TACO), Jun. 2009, vol. 6 (2), 99 pages.
Fung W.W.L., et al., "Dynamic Warp Formation and Scheduling for Efficient GPU Control Flow," Annual IEEE/ACM International Symposium on Microarchitecture, Dec. 2007, 12 pages.
Fung W.W.L., et al., "Thread Block Compaction for Efficient SIMT Control Flow," IEEE 17th International Symposium on High Performance Computer Architecture (HPCA), Feb. 2011, pp. 25-36.
Horn D.R., et al., "Interactive k-D Tree GPU Raytracing," Proceedings of the 2007 symposium on Interactive 3D graphics and games, Apr. 30-May 2, 2007, pp. 167-174.
Narasiman V., et al., "Improving GPU Performance via Large Warps and Two-Level Warp Scheduling," Proceedings of the 44th Annual IEEE/ACM International Symposium on Microarchitecture (MICRO), Dec. 2011, pp. 308-317.
Wald I., "Active Thread Compaction for GPU Path Tracing," Proceedings of the ACM SIGGRAPH Symposium on High Performance Graphics, Aug. 5-7, 2011, pp. 51-58.
Mei, et al., "Divergence Barrier," Feb. 20, 2013, 11 pp.
International Search Report and Written Opinion—PCT/US2014/054966—ISA/EPO—Jan. 8, 2015, 18 pp.
Rhu et al., "CAPRI: Prediction of compaction-adequacy for handling control-divergence in GPGPU architectures," Computer Architecture (ISCA), 2012 39th Annual International Symposium on, IEEE, XP032200022, DOI: 10.1109/ISCA.2012.6237006, ISBN: 978-1-4673-0475-7, Jun. 9, 2012, pp. 61-71.
International Preliminary Report on Patentability from International Application No. PCT/US2014/054966, dated Jan. 26, 2016, 11 pp.
Second Written Opinion from International Application No. PCT/US2014/054966, dated Sep. 9, 2015, 11 pp.
Response to Written Opinion dated Jan. 8, 2015, from International Application No. PCT/US2014/054966, filed on Jul. 30, 2015, 9 pp.
Kingxing Jin: "Improving GPU SIMD Control Flow Efficiency Via Hybrid Warp Size Mechanism", Jul. 31, 2012, pp. 1-82, XP055209489, University of Saskatchewan Retrieved from the Internet: URL:http://ecommons.usask.ca/bitstream/handle/1 0388/ETD-2012-06-527/JIN-THESIS. pdf.

* cited by examiner

GPU DIVERGENCE BARRIER

TECHNICAL FIELD

This disclosure relates to graphics processing, and more particularly, to techniques for managing the execution of threads on a graphics processing unit (GPU).

BACKGROUND

Recently there has been a move toward so-called general purpose GPUs (GPGPUs). Unlike traditional GPUs, which perform graphics rendering, GPGPUs may be configured to execute a general purpose task or program, often referred to as a "kernel." Some types of tasks may be better suited to particular a type of processor, such as a central processing (CPU) or GPU. CPUs may be better suited for tasks with more branches, jumps, and conditional logic, while GPUs may be suited to highly parallel tasks and/or tasks with many floating point calculations. GPUs may also include the capability to execute SIMD (Single Instruction multiple Data) instructions, as many GPUs have a SIMD hardware architecture. When a GPU executes a SIMD instruction, the GPU may execute the same operation, indicated by the instruction, on multiple data values. Typically, a GPU has multiple execution units which are capable of executing the operations indicated by the SIMD instruction in parallel.

SUMMARY

The techniques of this disclosure provide techniques for reducing divergence among threads executing on a graphics processing unit (GPU). The GPU may include support for an instruction referred to as a "divergence barrier" instruction. The divergence barrier instruction attempts to group divergent threads from multiple warps into new warps such that the threads are executing the same instruction, thereby improving GPU performance.

In one example, this disclosure describes a method comprising determining, for each warp of a plurality of warps, whether a Boolean expression is true for a corresponding thread of each warp, pausing execution of each warp having a corresponding thread for which the expression is true, determining a number of active threads for each of the plurality of warps for which the expression is true, sorting the plurality of warps for which the expression is true based on the number of active threads in each of the plurality of warps, swapping thread data of an active thread of a first warp of the plurality of warps with thread data of an inactive thread of a second warp of the plurality of warps, and resuming execution of the at least one of the plurality of warps for which the expression is true.

In another example, this disclosure describes a device that includes a memory, and at least one programmable processor configured to: determine, for each warp of a plurality of warps, whether a Boolean expression is true for a corresponding thread of each warp, pause execution of each warp having a corresponding thread for which the expression is true, determine a number of active threads for each of the plurality of warps for which the expression is true, sort the plurality of warps for which the expression is true based on the number of active threads in each of the plurality of warps, swap thread data of an active thread of a first warp of the plurality of warps with thread data of an inactive thread of a second warp of the plurality of warps, and resume execution of the at least one of the plurality of warps for which the expression is true.

In another example, this disclosure describes an apparatus that includes means for determining, for each warp of a plurality of warps, whether a Boolean expression is true for a corresponding thread of each warp, means for pausing execution of each warp having a corresponding thread for which the expression is true, means for determining a number of active threads for each of the plurality of warps for which the expression is true, means for sorting the plurality of warps for which the expression is true based on the number of active threads in each of the plurality of warps, means for swapping thread data of an active thread of a first warp of the plurality of warps with thread data of an inactive thread of a second warp of the plurality of warps, and means for resuming execution of the at least one of the plurality of warps for which the expression is true.

In another example, this disclosure describes a non-transitory computer-readable storage medium storing instructions that, when executed, cause at least one programmable processor to: determine, for each warp of the plurality of warps for which the expression is true, an associated divergence barrier of a plurality of divergence barriers, group each warp of the plurality of warps into a plurality of compaction pools based on the associated divergence barrier of each warp, wherein the instructions that cause the at least one processor to sort the plurality of warps comprise instructions the at least one processor to sort the plurality of warps belonging to a same one of the plurality of compaction pools, wherein the first warp and the second warp comprise warps belong to the same one of the plurality of compaction pools, and wherein the instructions that cause the at least one processor to resume execution of the at least one of the plurality of warps for which the condition is true comprises resuming execution of at least one warp of the same one compaction pool.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
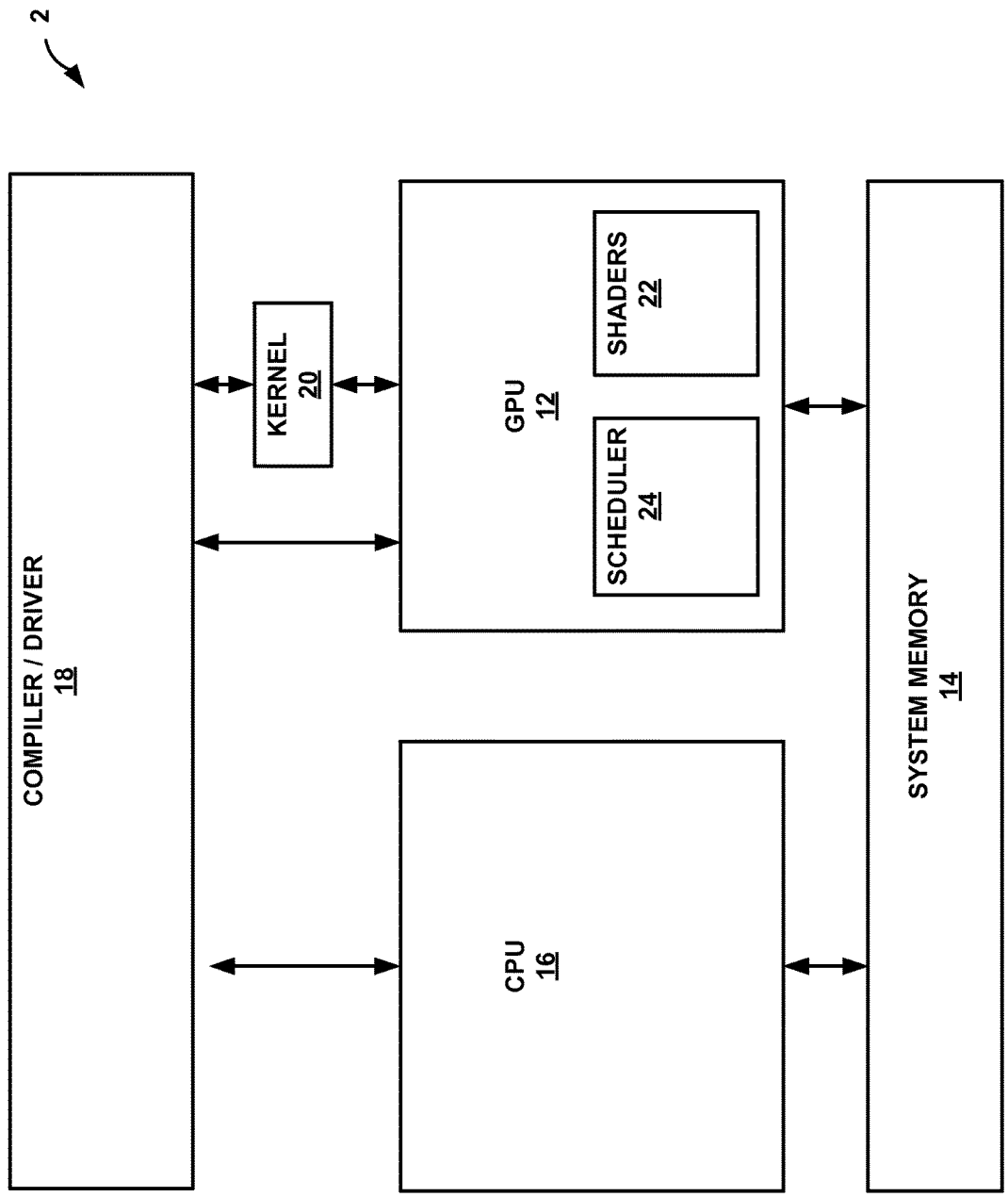
FIG. 1 is a block diagram illustrating an example computing device that may support execution of a GPU divergence barrier instruction in accordance with the techniques of this disclosure.

This disclosure is directed to techniques for reducing divergence of threads executing on a graphics processing unit (GPU). A GPU may include multiple execution units, referred to as processing elements (PEs). A program, referred to as a "kernel," may execute on one or more PEs of the GPU. An application may divide the kernel into multiple threads, which constitute the basic unit of work of the GPU. The GPU scheduler may further group the threads together into a thread group referred to as a "warp." A warp may include a certain number of threads, for example 32 threads on some graphics architectures.

A driver or scheduler for the GPU creates threads to execute the kernel on the GPU. A thread is the basic unit of data to be processed on the GPU, and should not be confused with a CPU thread. The Scheduler may assign each thread to an execution unit of the GPU. The execution units, also referred to as processing elements ("PEs") or shaders, are SIMD units capable of parallel execution of the same instruction on multiple data values.

In general, each thread of a warp executes the same instruction. A program counter (PC) stores the memory address of the instruction that each thread is to execute. Generally, there may be a single PC for each of the threads of a warp. Having a single PC for each warp allows each of the threads to execute simultaneously as long as each of the threads do not need to execute different instructions.

Many GPUs now include the ability to execute flow control instructions, e.g. to execute branch, jump, goto, and other flow control instructions. Flow control instructions may alter the flow of program execution in a number of ways. In a program or kernel without flow control instructions, a PE may execute instructions of the kernel from start to finish. After a PE finishes executing an instruction, the GPU sets the value of the PC to the address of the next instruction in memory (typically by incrementing the PC value by one), and the PE executes the next instruction. The process of executing the program continues in this fashion a program without flow control instructions until the program reaches an exit point, at which point execution terminates.

Executing a flow control instruction may cause a PE to execute a subsequent instruction at an address other than the incremented PC value. Instead of executing a subsequent instruction at the address of the incremented PC value, a PE that executes a flow control instruction may execute a subsequent instruction that has a different PC address, such as the address of a subroutine, etc. Thus, a flow control instruction is said to alter the execution "flow" of a program.

Examples of flow control instructions include subroutine calls, branches, returns, jumps, etc. In various examples, the instruction address to which a PE "jumps," i.e. the address that is assigned to the PC, may be based on the value of data that varies between threads at run-time. Flow control instructions may also be associated with a Boolean expression that each PE evaluates separately. A Boolean expression is an expression that produces a Boolean value that evaluates to either true or false. A Boolean expression may include Boolean operators, such as "and," "or," "not," "exclusive or (XOR)," etc. A Boolean expression may also include arithmetic tests, such as greater than, less, than, equal to, not equal to, greater than or equal to, less than or equal to, etc. The truth or falsity of the Boolean expression may depend on data or values that vary from one thread to another.

Thus, it may be possible for one thread to jump to, and execute a different instruction than another thread within the same warp. However, as stated above, there is only one PC for the warp. The condition where two or more threads of a warp execute different instructions is referred to as "divergence." When divergence occurs, some sets threads may continue to execute the same instructions. However, there may be multiple sets of threads that execute different instructions, as well.

As an example of thread divergence, a first thread and a second thread of a warp may execute a flow control instruction, such as an "if-else" statement or loop statement. The subsequent instruction that the first thread executes may be based on the values of data stored in a register of the first thread. Similarly, the subsequent instruction of the second thread may be based on the value of data stored in a register of the second thread. If the first and second threads have different register data, the first and second thread may jump to different subsequent instructions, which are associated with different instruction addresses.

In the case where warp threads are divergent, threads may take different branches of control flow blocks such as an "if-else" statement. In the case of a loop statement, warp threads may also exit the loop statement at different times, e.g. after executing different numbers of iterations of the loop.

When warp threads become divergent, e.g. due to taking different branches of an if-else statement, or performing different numbers of iterations of a loop, the GPU serializes each of the different execution paths caused by the divergence. That is, the GPU determines threads that are "active" and are executing the same instruction. The active threads continue to execute on PEs associated with each thread, until the threads finish execution, or reach a barrier, such as a divergence barrier instruction, discussed in greater detail below.

During serialization, the GPU also determines threads that are not currently executing, and sets those inactive threads and their associated PEs to idle. While the PEs are set to idle, the inactive threads do note execute, which hurts GPU performance. In some cases, divergent threads may further diverge, i.e. there may be multiple "levels" or "nested divergence." To handle nested divergence, a GPU uses a convergence stack to track nested branches and loops. The GPU handle the deepest or innermost layer of divergence first, and executes the threads with the deepest level of divergence until execution completes or pauses. The GPU then removes that level of divergence from the convergence stack, and repeats the process of executing the innermost remaining thread on the convergence stack, and removing completed threads from the convergence stack. Once a thread finishes executing a branch or loop, the GPU may recombine or converge the threads back together to form warps that are no longer divergent.

The techniques of this disclosure introduce an instruction which a GPU may support, referred to as a "divergence barrier" instruction. In various examples, an application programming interface (API) may include support for the divergence barrier instruction. Such APIs may include the Open Compute Language (OpenCL), Open Graphics Language (OpenGL), and Microsoft DirectX APIs. When programming a GPU with a particular API, a programmer may insert divergence barrier function calls, which cause the GPU to execute the divergence barrier instruction, at code points where divergence is likely to significantly impact performance. A GPU driver or compiler may also automatically detect code points where divergence is likely to significantly impact performance, and may insert divergence barrier instructions at those code points.

A CPU then transmits the code of a kernel that includes the divergence barrier instructions to the GPU for execution. The GPU then executes the kernel code until it encounters a divergence barrier instruction. Each divergence barrier instruction causes the GPU to evaluate a Boolean expression. If the GPU evaluates the Boolean expression as true, the GPU pauses execution of the warp. The GPU switches to, and begins execution of another warp. The GPU continues the process of executing warps until all the warps of the kernel either finish execution, or are paused (e.g. due to executing a divergence barrier instruction). Once all the warps finish execution or are paused, the GPU attempts to eliminate divergence amongst the warps that are currently paused as a result of executing a divergence barrier instruction.

When a GPU executes the divergence barrier instruction and pauses execution of a warp, the GPU inserts the warp into a queue of warps that are currently paused due to having executed the divergence barrier instruction. Upon being placed into the queue, the GPU sorts the warps in the queue based on the number of active threads in each warp using an insertion sort and sorts each of the paused warps in the queue using an insertion sort. After all warped are paused and sorted in queue (or finished), the GPU then attempts to eliminate divergence among threads of warps executing the kernel. The process of eliminating divergence amongst threads of warps is referred to as "thread compaction."

During thread compaction, the GPU attempts to form warps having threads that have no divergence or less divergence by swapping currently active warps having more inactive threads with inactive threads from warps having more active threads. The GPU uses a warp sort queue in order to minimize the data amount of exchanged when swapping threads from different warps. During GPU thread compaction, which results in the formation of new warps, the GPU may continue execution of each new warp as soon as a warp having all active threads is formed. In this manner, a GPU configured to support a divergence barrier instruction may reduce warp thread divergence, and improve GPU performance.

FIG. 1 is a block diagram illustrating an example computing device that may support execution of a GPU divergence barrier instruction in accordance with the techniques of this disclosure. FIG. 1 includes computing device 2. Computing device 2 may comprise a personal computer, a desktop computer, a laptop computer, a computer workstation, a tablet computing device, a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a CPU 16, a system memory 14, a graphics processing unit (GPU) 12, and a compiler/driver 18. CPU 16 may execute various types of applications. Examples of the applications include web browsers, e-mail applications, spreadsheets, video games, or other applications that generate viewable objects for display. Instructions for execution of the one or more applications may be stored within system memory 14.

CPU 16 may also execute compiler/driver 18. Compiler/driver 18 may comprise a compiler and/or a driver that controls the interaction of GPU 12. Compiler/driver 18 may take program code, such as code written in a particular graphics application programming interface (API), and translate the code into kernel 20. Kernel 20 is comprised of native code, e.g. binary instructions, that GPU 12 is capable of executing. Compiler/driver 18 may also manage run-time execution of GPU 12. As described in greater detail below, compiler/driver 18 may insert divergence barrier instructions into kernel 20 at run-time in accordance with the techniques of this disclosure. CPU 16 may transmit kernel 20 to GPU 12 for further processing.

GPU 12 may be specialized hardware that allows for massively parallel processing, which is well-suited well for processing graphics data. In this way, CPU 16 offloads graphics processing that is better handled by GPU 12. CPU 16 may communicate with GPU 12 in accordance with a particular application processing interface (API). Examples of such APIs include the DirectX® API by Microsoft® and the OpenGL® by the Khronos group; however, aspects of this disclosure are not limited to the DirectX and the OpenGL APIs, and may be extended to other types of APIs that have been developed, are currently being developed, or are to be developed in the future.

Figure 2:
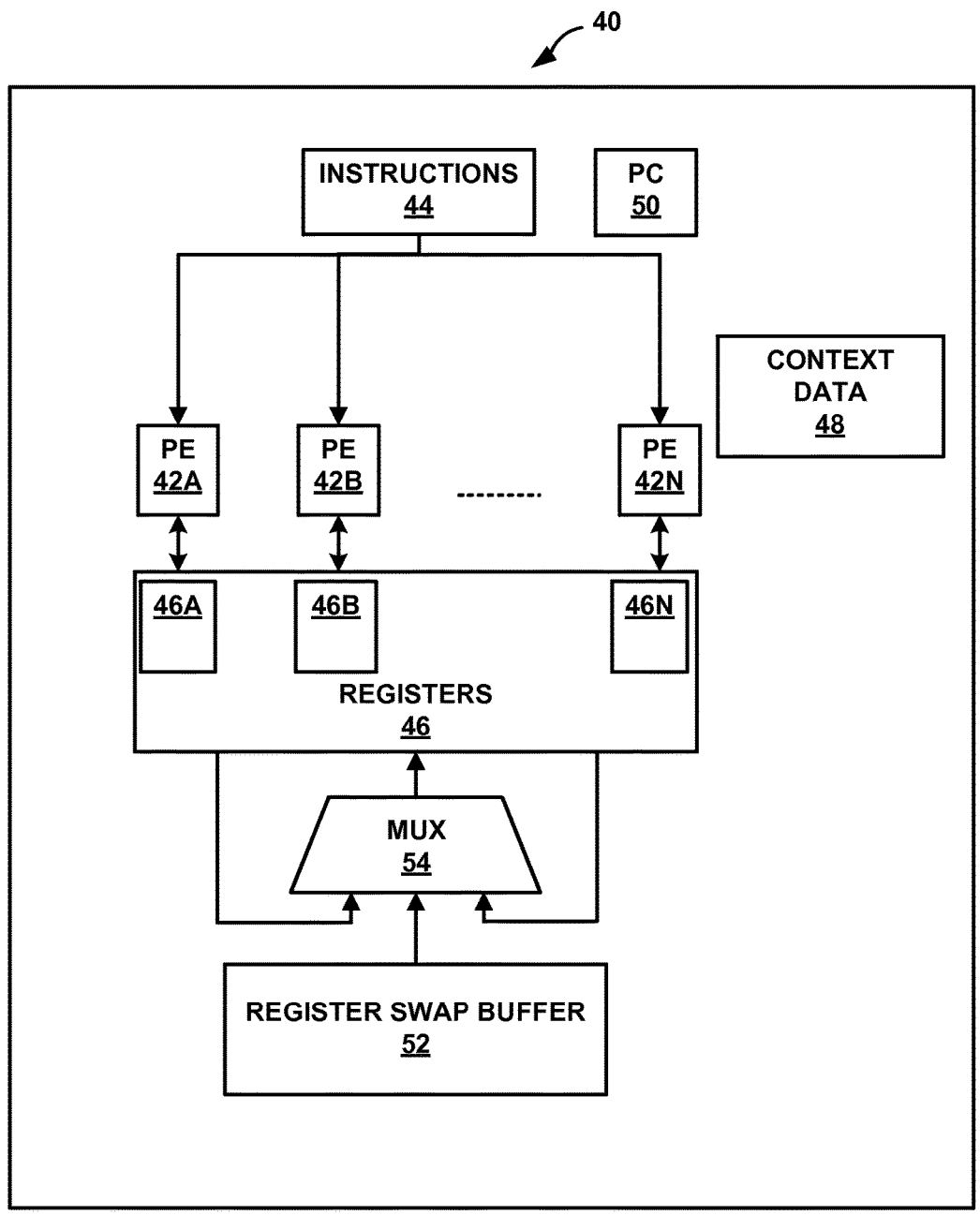
FIG. 2 is a block diagram illustrating a warp that executes on a plurality of processing elements in accordance with the techniques of this disclosure.

In addition to defining the manner in which GPU 12 is to receive graphics data from CPU 16, the APIs may define a particular graphics processing pipeline that GPU 12 is to implement. GPU 12, in FIG. 1, illustrates the graphics processing pipeline defined by the Direct3D 11 API. As described in more detail, FIG. 2 illustrates the graphics processing pipeline of the OpenGL 4.x API.

Examples of CPU 16 and GPU 12 include, but are not limited to, a digital signal processor (DSP), general purpose microprocessor, application specific integrated circuit (ASIC), field programmable logic array (FPGA), or other equivalent integrated or discrete logic circuitry. In some examples, GPU 12 may be specialized hardware that includes integrated and/or discrete logic circuitry that provides GPU 12 with massive parallel processing capabilities suitable for graphics processing. In some instances, GPU 12 may also include general purpose processing, and may be referred to as a general purpose GPU (GPGPU). The techniques described in this disclosure may also be applicable to examples where GPU 12 is a GPGPU.

System memory 14 may comprise one or more computer-readable storage media. Examples of system memory 14 include, but are not limited to, a random access memory (RAM), a read only memory (ROM), an electrically erasable programmable read-only memory (EEPROM), flash memory, or any other medium that can be used to carry or store desired program code in the form of instructions and/or data structures and that can be accessed by a computer or a processor.

In some aspects, system memory 14 may include instructions that cause CPU 16 and/or GPU 12 to perform the functions ascribed to CPU 16 and GPU 12 in this disclosure. Accordingly, system memory 14 may be a computer-readable storage medium comprising instructions that cause one or more processors, e.g., CPU 16 and GPU 12, to perform various functions.

System memory 14 may, in some examples, be considered as a non-transitory storage medium. The term "non-transitory" may indicate that the storage medium is not embodied in a carrier wave or a propagated signal. However, the term "non-transitory" should not be interpreted to mean that system memory 14 is non-movable. As one example, system memory 14 may be removed from device 10, and moved to another device. As another example, a system memory, substantially similar to system memory 14, may be inserted into device 10. In certain examples, a non-transitory storage medium may store data that can, over time, change (e.g., in RAM).

CPU 16 may also generate commands and data for GPGPU applications, for example commands and scene data for a ray tracing application, a physics simulation, or data for any other type of GPGPU kernel. GPGPU applications, e.g. kernel 20, may also be compiled using a graphics API, such as DirectX, or OpenGL, or using a more general purpose compute API, such as Open Compute Language (OpenCL), or OpenCompute, or DirectCompute. CPU 16 may transmit the data for the kernel 20 to a command buffer for processing. In various examples, the command buffer may be part of system memory 14, or part of GPU 12. In some examples, CPU 16 may transmit the commands and data of kernel 20 for GPU 12 to process via a special purpose bus, such as a PCI-Express bus or another general purpose serial or parallel bus.

To perform the operations stored of kernel 20 in the command buffer, GPU 12 may implement a graphics processing pipeline. The graphics processing pipeline includes performing as defined by software or firmware executing on GPU 12 and performing functions by fixed-function units that are hardwired to perform very specific functions. The software or firmware executing on the GPU 12 may be referred to as shaders, e.g. shader 22. Shaders 22 may execute on one or more processing elements (also referred to as "shader cores" or "PEs") of GPU 12. Shaders 22 provide users with functional flexibility because a user can program the shaders to execute desired tasks in any conceivable manner, as with any other processor. The fixed-function units, however, are hardwired for the manner in which the fixed-function units perform tasks. Accordingly, the fixed-function units may not provide much functional flexibility. The techniques of this disclosure are directed toward execution of a kernel, such as kernel 20, on GPU shaders 22.

Once CPU 16 transmits the data and/or commands associated with rendering a graphical scene or executing a kernel to the command buffer, GPU 12 begins execution of the commands through the graphics pipeline of GPU 12. Scheduler 24 of GPU 12 creates threads, which perform the basic unit of work associated with the kernel. Scheduler 24 assigns the threads to a particular processing element of shaders 22. Scheduler 24 also groups the threads into warps for execution and begins execution of the warps.

As discussed above, if different threads jump to different instructions as the result of executing a flow control instruction, the threads of a warp diverge. In the case of a divergent warp, the scheduler executes serially each set of threads. That is, GPU 12 no longer executes all of the warp threads in parallel, but serially in groups, which hurts GPU performance.

To improve GPU performance when warps are divergent, a programmer or compiler/driver 18 may insert a divergence barrier instruction into kernel 20. The divergence barrier is associated with a Boolean expression, which GPU 12 evaluates at run-time. A Boolean expression is an expression that evaluates as either true or false. A Boolean expression may include arithmetic operators, bitwise logical operators, and/or logical operators in various examples. By determining whether to execute a divergence barrier instruction based on a Boolean expression, the Boolean expression provides flexibility in controlling when the GPU should execute the divergence barrier. The Boolean expression evaluation is one way in which a divergence barrier instruction differs from a traditional barrier instruction. That is, unlike executing a traditional divergence barrier instruction, in which a GPU always stops execution of warps when executing the barrier instruction, warps do not have to stop at each divergence barrier because divergence barriers are associated with a Boolean condition, and divergence barriers are often located in control flow blocks that are also associated with the Boolean expression. An example of pseudocode for the divergence barrier instruction is:

divergence_barrier(Boolean expression);

The divergence barrier instruction causes the GPU to determine whether the Boolean expression associated with the divergence barrier instruction is true for at least one thread in each of a warp that reaches the divergence barrier instruction. If the condition is true for at least one thread, GPU 12 pauses execution of each of the plurality of the warps, sorts the warps based on the number of active threads, and then swaps inactive threads with active threads to form new active/inactive warps. GPU 12 continues to swap inactive threads with active threads until no inactive warps, having all inactive threads, can be created. Once no inactive warps can be created, GPU 12 resumes execution of the warps. If GPU 12 forms a warp having all active threads, GPU 12 may also immediately release from the queue and begin execution of that warp.

As one example in accordance with the techniques of this disclosure, GPU 12 of computing device 2 may be configured to perform a method comprising determining, for each warp of a plurality of warps, whether a Boolean expression is true for a corresponding thread of each warp, pausing execution of each warp having a corresponding thread for which the expression is true, and determining a number of active threads for each of the plurality of warps for which the expression is true. The method may further comprise sorting the plurality of warps for which the expression is true based on the number of active threads in each of the plurality of warps, swapping thread data of an active thread of a first warp of the plurality of warps with thread data of an inactive thread of a second warp of the plurality of warps, and resuming execution of the at least one of the plurality of warps for which the expression is true.

FIG. 2 is a block diagram illustrating a warp that executes on a plurality of processing elements in accordance with the techniques of this disclosure. FIG. 2, illustrates a thread warp 40 that executes on a plurality of processing elements 42A-42N (PEs 42). PEs 42 may be a part of one or more shaders 22 (FIG. 1). A thread warp, such as warp 40, may comprise a group of threads, which GPU scheduler 24 may assign to a plurality of processing elements, e.g. PEs 42, for execution. Each PE of FIG. 2 may comprise a single instruction multiple data (SIMD) unit, capable of executing a single instruction, such as a vector instruction, on multiple data values at a particular time. PEs 42 may also support execution of a single instruction on a single data value, such as a single operation on a single floating point value.

Warp 40 also includes instructions 44 that a scheduler of GPU 12 assigns PEs 42 for execution. In some examples, instructions 44 may be stored in a command buffer. Instructions 44 may include a set of instructions of a kernel that each PE is configured to execute. Program counter (PC) 50 indicates the current instruction that one or more of PEs 42 are to execute. After an instruction finishes executing on PEs 42, the value of PC 50 may be incremented to the address of the next instruction of kernel 20. Warp 40 also includes registers 46. Registers 46A-46N (registers 46) may be general purpose registers capable of holding multiple data values or a single value. Registers 46 may be "banked," that is, may load and store data for particular PE. As an example, register 46A may be limited to storing data for PE 42A, and may not load or store data for other PEs. 46 Each of registers 46 may supply data to and/or from one of PEs 42, which PEs 42 may then process. Warp 40 may also include warp context data 48. Warp context data 48 may include data that is common or shared amongst the different threads of warp 40. As an example, context data 48 may include data of a predication register, which may include data for each thread that executes on PEs 42 of warp 40.

Warp 40, PEs 42, instructions 44, registers 46, context 48, and PC 50 may comprise a core or part of a core of shaders 22 of GPU 12. In various examples, warp 40 may comprise part of a shader, such as a geometry shader, pixel shader, and/or a vertex shader, which may be part of a graphics pipeline of GPU 12. In some examples, GPU 12 may feed the results generated by a warp into another stage of the graphics pipeline for additional processing.

During execution of the kernel on warp 40, one or more of PEs 42 executes one of instructions 44 located at the address indicated by PC 50. During execution of an instruction, PEs 42 may read one or more data values from registers 46. PEs 42 may perform one or more operations on the data values, and store new values back to registers 46. PEs 42 may execute flow control instructions, such as branches, jumps, gotos, etc. The flow control instructions may cause one PE, e.g. PE 42A to jump to a different one of instructions 44 than PE 42B, i.e. the threads executing on the PEs may become divergent due to different evaluations of flow control. Because there is a single PC 50 however, PEs 42 may only execute one of instructions 44 indicated by PC 50 at one particular at a given time.

Once the threads of a warp diverge, PEs 42 may still only execute one instruction, indicated by the value of PC 50, at a particular time. To support divergent execution, warp 40 maintains state, such as a bitmask, that indicates which of PEs 42 should execute the instruction at the address of PC 50. As an example, PE 42A and 42B may be scheduled to execute different instructions resulting from taking different branches of an "if-else" statement. In this example, PE 42A executes a first instruction of instructions 44, and PE 42B executes a second, different instruction of instructions 44 at a later time. When PE 42A executes the first instruction, warp 40 sets the bitmask to indicate that PE 42A is active during the execution of the instruction, while PE 42B is inactive. PE 42A then continues to execute instructions 44 until the thread of PE 42A finishes execution or pauses executes divergence barrier instruction and pauses execution of the thread. Once PE 42A finishes execution, warp 40 changes the bitmask to indicate that only PE 42B is active, changes the value of PC 50 to the address of the instruction that PE 42B should execute, and then PE 42B executes the instructions specified by PC 50 until the thread pauses or finishes execution.

As stated above, the techniques of this disclosure include a divergence barrier instruction that, when executed, may improve performance of GPU 12 when threads of multiple warps, such as warp 40, diverge. The divergence barrier instruction may comprise part of an application programming interface (API), such as the DirectX 11 API, the OpenGL API, OpenCL, and/or DirectCompute, etc. A program written in such an API may insert a call to a divergence barrier function into kernel 20 that causes GPU 12 execute the divergence barrier instruction.

Compiler/driver 18, or an operating system may also insert calls to the divergence barrier instruction into the code of kernel 20. In various examples, a user may compile kernel 20 using compiler/driver 18. During compilation, compiler/driver 18 may analyze kernel 20 and determine at least one of a location where divergence is likely to occur, and a location that would significantly impact performance, and may insert divergence barrier instructions at least one of those locations. Compiler/driver 18 may insert divergence barrier instructions into the instructions of kernel 20 at run-time (also referred to as "bind time") at least one of a location where thread divergence is likely to occur, and a location that would significantly impact performance.

One example of code that may be likely to diverge, may be code of a raytracing application, which is included below. In this example, a divergence barrier instruction is inserted, e.g. (by a compiler or a user) to reduce divergence when executing the following raytracing pseudocode:

```
i = 0;
While ( i < dynamic_limit) { // dynamic_limit goes from 0 to 30
    divergence_barrier(i%10==0); //eliminate divergence after each 10
    loops
    //traverse scene tree and do ray intersection calculation
}
```

The above pseudocode is an example of a loop that multiple threads and warps of GPU 12 may execute. Each thread may execute the loop a different number of times, e.g. based on a number of bounces that a ray makes in a raytracing scene. Therefore, some threads may end after performing a few iterations of the loop, while other threads may continue execution of the loop for as many as thirty iterations of the loop.

In this example, GPU 12 executes the divergence barrier instruction during each loop iteration. The divergence barrier instruction includes a Boolean expression, which the GPU evaluates with each iteration of the loop. GPU 12 only executes the operations associated with the divergence barrier instruction, e.g. warp sorting and thread compaction if the Boolean expression evaluates to true for at least one thread of a warp. In this example, the Boolean expression, i %10==0, evaluates to true during every tenth iteration of the loop. When the Boolean expression is true for one thread of a warp, GPU 12 may swap threads from different warps in order to form new warps having more active threads, a process referred to as "thread compaction."

Whenever the Boolean expression associated with a divergence barrier of one warp thread evaluates to true, GPU 12 puts the warp associated with that thread, e.g. warp 40 into a queue or a buffer. Once the warp is placed into the queue, GPU 12 stops warp 40 from executing, and sorts the warps in the queue.

Figure 3:
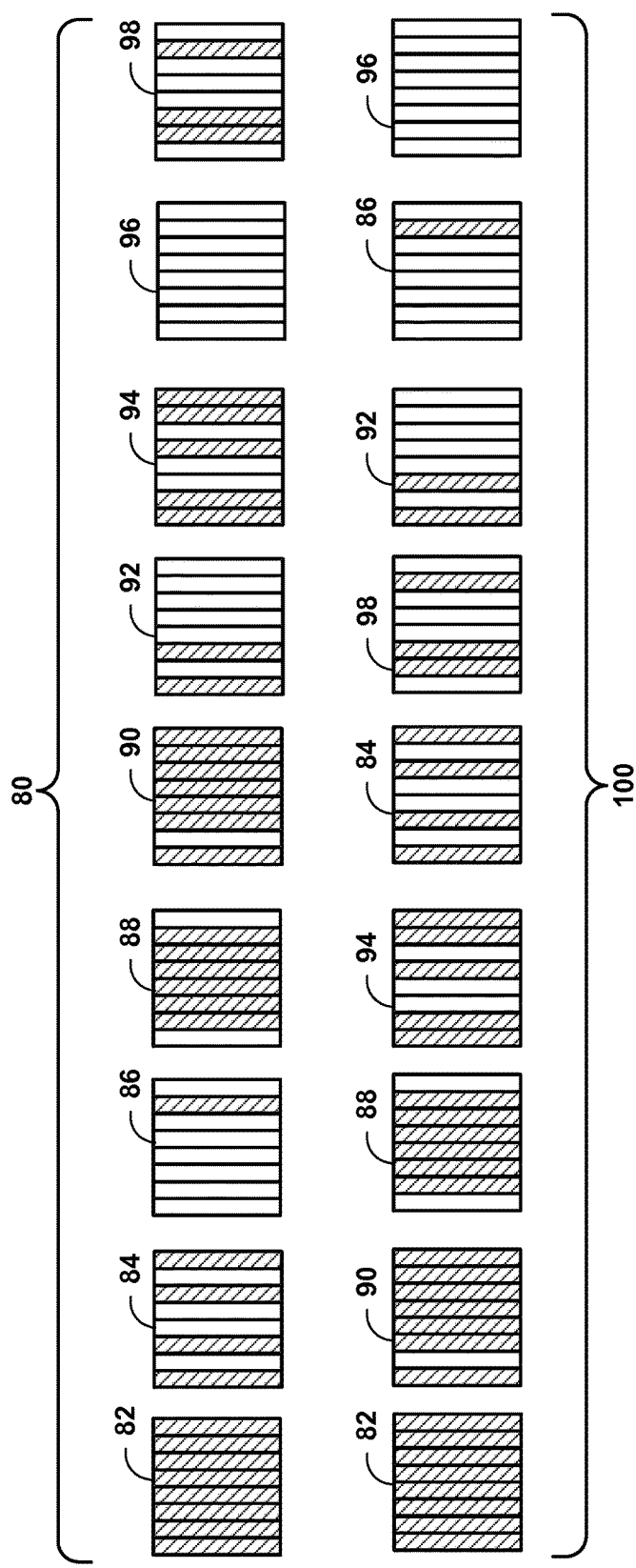
FIG. 3 is conceptual diagram illustrating sorting warps based on a number of active threads within each warp in accordance with the techniques of this disclosure.

Sorting a warp based on the number of active threads of each warp is illustrated in greater detail in FIG. 3. GPU 12 may sort each of the warps based on the number of active threads in each warp using an insertion sort. GPU 12 sorts the warps such that warps with more active threads are sorted to the front of the queue, and warps with fewer active threads are at the back of the queue.

After all warps either added into the queue or have completed without being paused at the barrier, GPU 12 then performs thread compaction on warps in the queue, i.e. swaps inactive threads from warps having a greater number of active threads with warps having a smaller number of greater number of threads. GPU 12 continues to swap threads from warps having a greater number of active threads with warps having a smaller number of active threads until GPU 12 cannot create an "inactive" warp. An inactive warp is a warp having all inactive threads. GPU 12 may also swap per-thread context data 48 if any when swapping an inactive thread data with active thread. Once a "fully active warp" having all active threads is created by swapping threads, GPU 12 removes the fully active warp from the queue, and sets its state to active and resumes execution of the fully active warp from the current instruction. After GPU 12 finishes thread compaction, all warps, including partially active warps and fully inactive warps, are set to the ready or active state. Partially active warps are also resumed from current instruction. Fully inactive threads can fast forward to the end of current control flow block, and if no instructions follow the current control block, the fully inactive warp can finish execution immediately. The process of swapping threads among warps is illustrated in greater detail with respect to FIG. 4.

To swap an active thread with an inactive thread, GPU 12 may store the register data stored of the inactive thread and the active thread in register swap buffer 52 in some examples. GPU 12 then stores the register data of the formerly inactive thread in the corresponding register of the formerly active thread. GPU 12 also stores the register data of the formerly active thread in the corresponding register of the formerly inactive thread using multiplexer 54 ("MUX 54"). More particularly, for each register associated with each thread, multiplexer 54 ("MUX 54") multiplexes between the stored register values of the inactive and active threads, and stores the values back to the register files of the warps that are to be swapped. During the swap process, DBS 50 may also swap per-thread context data 48 from the first and second warps. In some examples, GPU 12 may not utilize register swap buffer 52 to swap register data. Rather, GPU 12 may swap register values in parallel rather than storing the values in a buffer.

In some examples, each warp may refer to a set of registers 46 associated with a particular thread, referred to as a "bank," using a register pointer. GPU 12 may store a mapping table of pointers. Each row or column of the table may correspond to a particular warp, and each entry within the row or column corresponding to the warp (depending on the table layout) may store a pointer value that maps a particular thread to a register bank within registers 46. GPU 12 may store the mapping of pointers to register banks for the threads of a warp in context data 48. In some examples, if registers 46 are referenced by per-thread register bank pointers, GPU 12 may swap per-thread register data by simply swapping the per-thread register bank pointer values of two threads, rather than swapping each of the corresponding register values of two threads using register swap buffer 52, and mux 54.

In some examples, executing kernels may frequently access global memory, e.g. of GPU 12, and/or system memory 14 or perform other operations that have a high amount of access time or latency. In this case, barrier operations, including divergence barrier operations, may pause too many warps to hide these long latency operations, and execution performance may suffer. In order to speed the execution of kernels with long latency operations, GPU 12 may perform thread compaction immediately once the number of active warps (the active warp pool) reaches a certain threshold.

Some kernels may include a mixture of "traditional" barrier operations and divergence barrier operations. Traditional barrier operations cause all warps that reach the barrier to pause, and unlike divergence barriers are not associated with a Boolean condition that GPU 12 evaluates at runtime. Traditional divergence barrier operations also do not cause GPU 12 to perform thread sorting and thread compaction. For kernels that include a mix of traditional barriers and divergence barriers, divergence barrier instructions should yield to traditional barrier operations. In a kernel having a mixture of both traditional and divergence barriers, GPU 12 may perform thread compaction without waiting for warps to pause due to executing a traditional barrier operation.

Some kernels may also include subroutine calls. During a subroutine call, a GPU may swap threads data with a warp having a different call stacks associated with the called subroutine. Subroutine calls may be problematic when divergence barrier operations are included within such a call. For example, a thread of a first warp may call a subroutine at a first line, e.g. line 10, of a kernel. A second warp may call the same subroutine at a later execution point, e.g. line 20 of the kernel. The subroutine includes a divergence barrier instruction.

Due to the execution intervening instructions and/or other factors, the stacks of the first warp and the second warp may differ from each other when the first and second warps execute the divergence barrier instruction inside the subroutine. In one example solution to the problem of having divergence barriers inside subroutines, GPU 12 may prohibit having divergence barriers inside subroutines entirely. In another example solution, GPU 12 may implement logic to ensure that warps executing subroutines having divergence barrier instructions have the same stacks when executing the divergence barrier instructions inside the subroutine calls.

FIG. 3 is conceptual diagram illustrating sorting warps based on a number of active threads within each warp in accordance with the techniques of this disclosure. The example of FIG. 3 illustrates a number of unsorted warps 80. GPU 12 sorts unsorted warps 80 responsive to evaluating a Boolean expression associated with a divergence barrier instruction as being equal to true, as described above. In the example of FIG. 3, unsorted warps 80 include warps 82, 84, 86, 88, 90, 92, 94, 96, and 98. In unsorted warps 80, active warps are illustrated with diagonal hashing. Inactive warp threads are illustrated without any hashing.

GPU 12 sorts unsorted warps 82 based on the number of active threads in each warp. The resulting sorted warps are illustrated in FIG. 3 as sorted warps 100. Of unsorted warps 80, warp 82 has the most active threads (all active), followed in order by warp 90, warp 88, warp 94, warp 84, warp 98, warp 92, warp 86, and warp 96 (all inactive). As illustrated in FIG. 3, GPU 12 sorts unsorted warps 80 using an insertion sort. The result of the insertion sort based on the number of active threads in each warp is illustrated in FIG. 3 as sorted warp 100. In various examples, GPU 12 may store unsorted warps 80 in a queue, then sort the warps in-place in the queue, which results in sorted warps 100 being the queue. In various examples, the queue may be implemented as a linked list of pointers. Each pointer may point to a particular warp. To sort the linked list, GPU 12 may swap pointers associated with the warps in the linked list.

Figure 4:
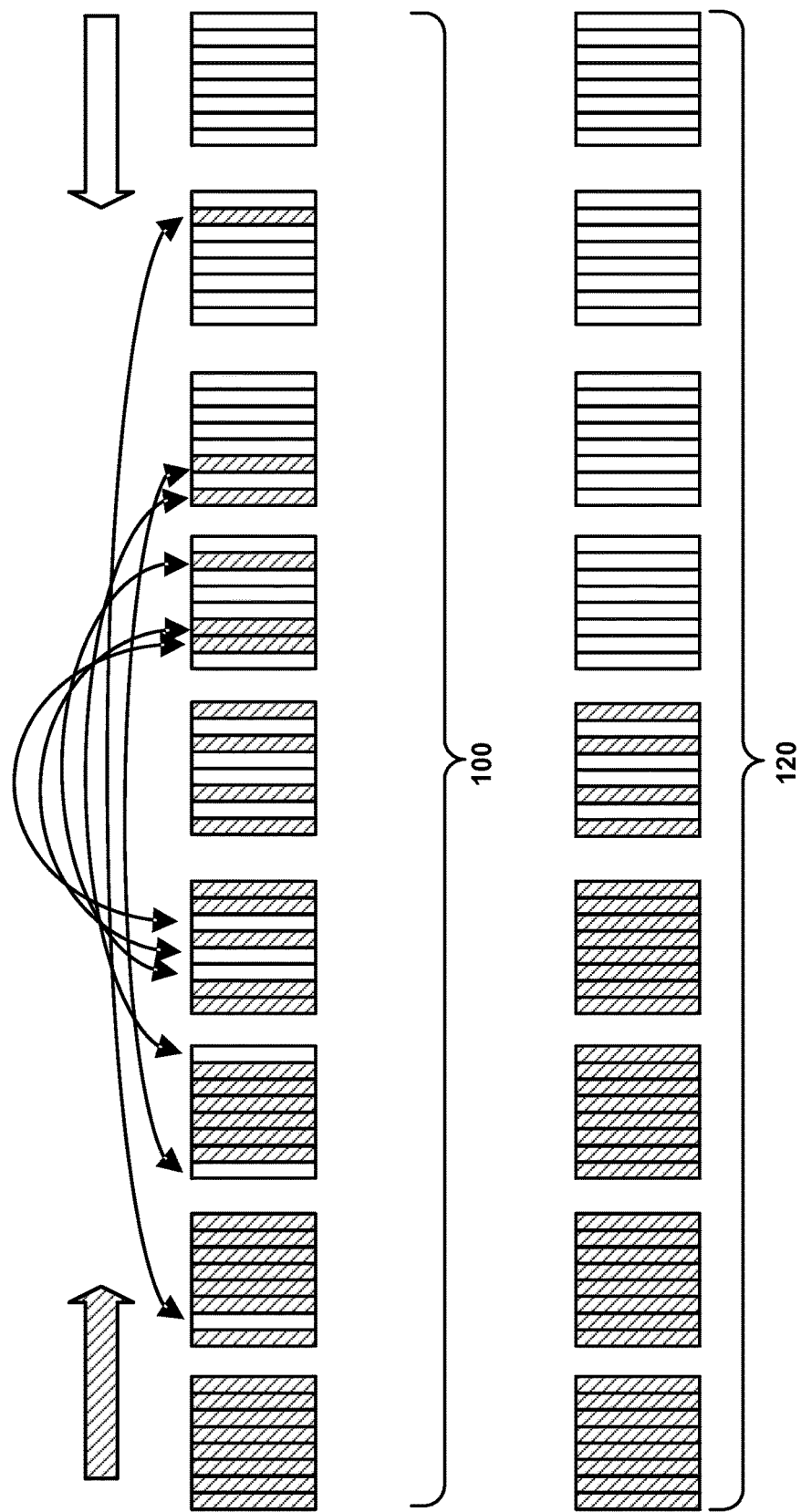
FIG. 4 is a conceptual diagram illustrating techniques for swapping active threads from one warp with inactive threads from another warp.

FIG. 4 is a conceptual diagram illustrating techniques for swapping active threads from one warp with inactive threads from another warp. In the example of FIG. 4, GPU 12 has previously sorted unsorted warps 80 into sorted warps 100. GPU 12 swaps inactive threads with active threads of sorted warps 100. GPU 12 swaps inactive threads with active threads until no more "inactive warps," i.e. warps with all inactive threads, can be created. The process of swapping inactive threads with active threads is referred to as "thread compaction." The result of swapping the inactive threads with the active threads of sorted warps 100 is illustrated as compacted warps 120.

GPU 12 swaps inactive threads with active threads based on the number of active and inactive threads in the two warps. In the example of FIG. 4, GPU 12 swaps threads from warps having more active threads with threads from warps having fewer active threads. In FIG. 4, GPU 12 swaps threads of a leftmost warp having an inactive thread with a rightmost warp having an active thread. GPU 12 continues to swap threads from different warps from the outside in, i.e. swapping inactive threads from warps having more active threads with active threads from warps having more inactive threads until no more inactive warps can be created. Scheduler 24 resumes execution of any and all warps that still remain in the queue at that time. Additionally, whenever the warp at the head of the queue contains all active threads, scheduler 24 releases the warp having all active threads located at the head of the queue and begins execution of that warp.

By swapping inactive threads with active threads, the techniques of this disclosure form warps that have a larger number of active threads, as well as warps that have all inactive threads. Warps having a greater number of active threads increase the utilization and throughput of GPU 12. Warps having all inactive threads may also increase the throughput of GPU 12 because inactive warps may "fast forward" to the end of the current control flow block or finish execution if no instructions follow the current control block. Thus, warps having all inactive threads may finish execution immediately in some cases. Thus, GPU 12 may reduce execution time or stop execution of such an inactive warp and utilize the PEs associated with the inactive warp to execute a different warp that scheduler 24 determines can execute on those PEs.

Figure 5:
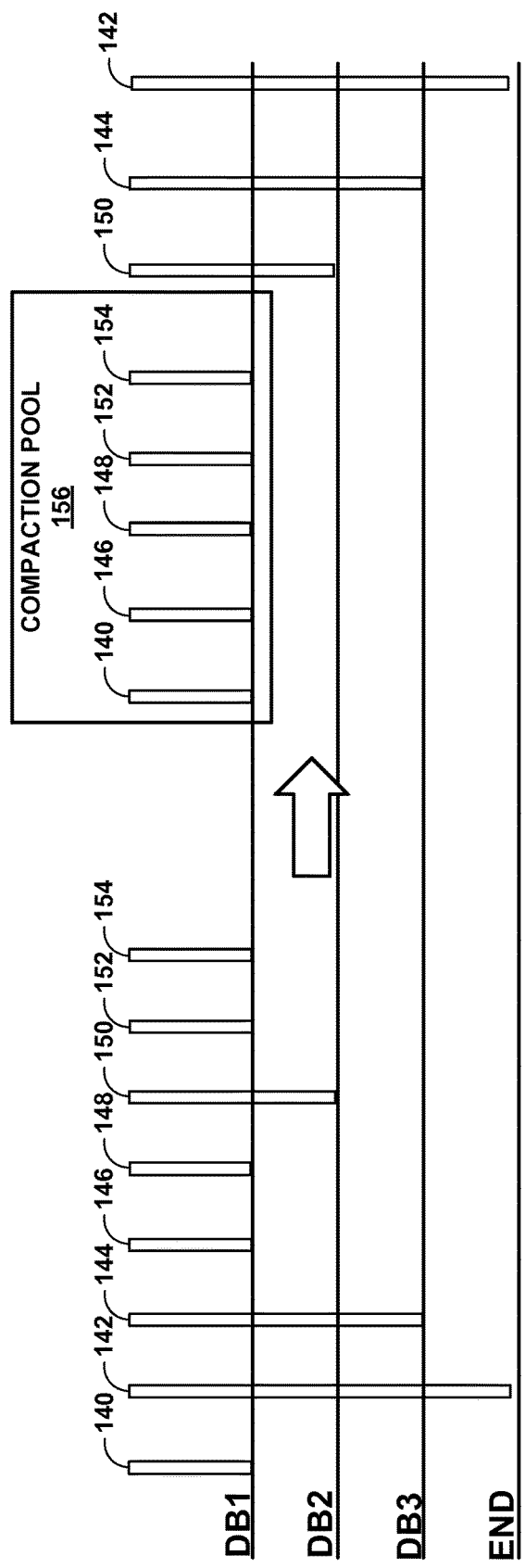
FIG. 5 is a conceptual diagram illustrating techniques for handling multiple divergence barrier instructions in accordance with the techniques of this disclosure.

FIG. 5 is a conceptual diagram that illustrates techniques for handling multiple divergence barrier instructions in accordance with the techniques of this disclosure. Because a divergence barrier is often located in control flow blocks, which also have associated a Boolean condition, warps may either enter the control flow branch where divergence barrier is located if the GPU evaluates that the Boolean condition is true for any thread of that warp, or the GPU may allow the warp to pass through the control flow block where divergence barrier is located and continue execution. Warps may pass through a divergence barrier if they do not enter the control flow branch where the barrier is located or if the Boolean conditions of the divergence barrier are false for all threads in the warp. In the example of FIG. 5, GPU 12 executes kernel 20 that includes multiple divergence barriers, referred to as "DB1," "DB2," and "DB3." As one example, the kernel may be of a raytracing application. FIG. 5 illustrates the progress of eight threads, threads 140, 142, 144, 146, 148, 150, 152, and 154 through the kernel. The length of the bars of threads 140-154 indicates whether each thread has reached one of the divergence barriers, DB1-DB3, or has finished execution entirely ("END") of the kernel.

In the example of FIG. 5, each of DB1, DB2, and DB3 are located at different points in the kernel. One example pseudocode of sample that contains three divergence barriers that correspond to DB1, DB2, and DB3, is included below:

```
i = 0;
while(i < dynamic_limit){ // dynamic_limit goes from 0 to 30
    divergence_barrier(i%10==0); //DB1 for each 10 loops
    i++;
    // do some work ...
}
if (dynamic_codition) {
    divergence_barrier(true); // DB2 for long control flow block
    // do some heavy work
}
```

-continued

```
else {
    divergence_barrier(true); // DB3 for long flow control block
    // do some heavy work
}
```

The kernel pseudocode includes multiple divergence barrier instructions, DB1, DB2, and DB3. Each of the divergence barrier instructions occurs in an branch statement or loop statement. Warps executing kernel 20 may reach the different divergence barriers depending on which control blow block they enter and the evaluation of the Boolean conditions, e.g. barrier conditions associated with the divergence barrier instructions. Threads executing kernel 20 may encounter DB1 first in the execution of kernel 20, followed by DB2 or DB3.

GPU 12 may handle the process of sorting warps and performing thread compaction similarly when multiple divergence barrier instructions are present in a kernel, as opposed to a single divergence barrier instruction. In particular, scheduler 24 may group warps together that reach the same divergence barrier into what is referred to as a "compaction pool." GPU 12 may compact the threads of warps in the compaction pool, which have reached the same divergence barrier instruction.

More particularly, GPU 12 associates a prefix associated with the divergence barrier that a warp has reached with each warp. As an example, warps that reach the first divergence barrier may have a prefix "1," warps that reach a second divergence barrier may have a prefix "2," etc. Each warp is also assigned a second number, e.g. a suffix, that indicates the number of active threads in that warp. As an example, if a warp has three active warps, the warp is assigned the suffix "three" (3).

The combination of the prefix and the suffix forms a number that GPU 12 uses to sort the warps in the warp queue. As an example, there may be three threads in the warp queue for GPU 12 to sort. A first warp has reached divergence barrier "2," and has four (4) active threads. GPU 12 may assign the first warp the number "24" for sorting purposes. A second warp may have reached divergence barrier "1," and have one (1) active thread. GPU 12 may assign the second warp the value "11." A third warp may have reached divergence barrier "1," and has 3 (three) active threads. GPU 12 may assign 13 as the sorting value for the warp. GPU 12 sorts the warps in the queue by values of each warp. The result of the sort may be that such that the third warp (having sort value 11) is at the head of the queue, the second warp (having sort value 13) is second in the queue, and the first warp (having sort value 24) is at the tail of the queue. Because the warps having sort values 11 and 13 have the same prefix, "1," GPU 12 may form a compaction group.

After GPU 12 pauses all warps, and inserts the warps in the queue (or finishes execution if the warps are not paused on a barrier), GPU 12 performs thread compaction on warps in the first warp group by swapping active threads with inactive threads. In other words GPU 12 eliminates all divergence on the first divergence barrier before eliminating divergence on subsequent divergence barriers, i.e. GPU 12 eliminates divergence on divergence barrier DB1 before moving onto divergence barriers DB2, DB3, etc.

To eliminate divergence associated with a particular divergence barrier, GPU 12 detaches a first warp group from the queue, forms a compaction pool and performs compaction on the warps in the pool. As GPU 12 executes compaction, GPU 12 releases warps from the compaction pool and resumes the warps upon execution such that GPU 12 may pause the released warps again upon reaching any subsequent divergence barriers. Meanwhile, the queue containing the remaining warps continues to receive additional warps paused on any divergence barriers. GPU 12 may pause the resumed warps if they reach barriers DB2, DB3, or even DB1 again in the case of a loop. GPU 12 adds the warps to the queue and sorts the warps with other warps in the queue as described above.

When all those warps are paused and inserted in the queue, i.e. the queue gets full again, GPU 12 repeats the same compaction process on the current first group in the queue, which may be for DB2 for example. Note that before GPU 12 completes the previous compaction and releases all warps from previous compaction pool, GPU 12 may not have all warps in the queue and start another around of compaction. Thus, there is not a conflict between consecutive compaction processes. Once all warps are paused on same barrier, which forms only one group in the queue, GPU 12 may detach all of the paused warps from the queue and empty the queue.

Because warps paused on a barrier at the front of the queue, for example DB1, are likely to hit subsequent barriers, e.g. DB2/DB3 later on, GPU 12 may utilize the technique of compacting only the first warp group in order to be able to group as many divergent warps together into compaction pools as possible when performing compaction for subsequent barriers (e.g. DB2, DB3, etc.). By compacting one barrier at-a-time, this technique may improve efficiency of thread compaction by enabling compaction of a greater number of warps in a compaction pool during compaction of subsequent divergence barriers.

In case of multiple barriers, GPU 12 may begin performing compaction on divergence barriers earlier, i.e. when queue is not full, in same fashion and under the same conditions described above. Those conditions may include, for example, a kernel program contains traditional barriers, or incurs frequent long latency operations.

When multiple divergence barriers are present in a kernel, and the Boolean expression associated with the warp evaluates to true for at least one warp thread, GPU 12 places the warp into a queue and associates a prefix with the warp. The prefix indicates the particular divergence barrier that the warp has reached. As one example, scheduler 24 may append a prefix such as "1" to an identifier associated with each of warps 140, 146, 148, 152, and 154 to indicate that those warps have reached divergence barrier DB1. Scheduler 24 may add similar prefixes (e.g., "2," "3") to warps 144 and 150 to indicate that those warps have reached divergence barriers DB3 and DB2, respectively.

DBM 52 stores each of warps 140, 142, 144, 146, 148, 150, 152, and 154 in a queue. Warps 140-154 are initially unsorted and are associated with prefixes based on which divergence barrier the warps have reached. DBM 52 initially sorts warps 140, 142, 144, 146, 148, 150, 152, and 154 based on the prefix associated with each of the threads and groups the warps together into compaction groups based on the prefix number.

The group of warps having a prefix corresponding to the earliest divergence barrier, e.g. DB1 is referred to as the "compaction pool." In the example of FIG. 1, compaction pool 156 includes warps 140, 146, 148, 152, and 154, all of which have reached divergence barrier DB1, and therefore include the same prefix.

As described above, GPU 12 sorts the warps of compaction pool 156 based on the prefix, which is derived based on the divergence barrier number reached, and the suffix, which is related to the number of active threads in each warp. After GPU 12 pauses all warps (except those that have finished execution) on barriers, and inserts the paused warps into the queue, and sorts the warps in the queue, GPU 12 detaches the first warp group from the queue, which represents the front-most barrier in the queue, and forms a compaction pool with this group. GPU 12 then performs thread compaction by swapping inactive threads of warps in the compaction pool having a larger number of active threads with active threads of warps in the compaction pool having a larger number of inactive threads until no more inactive warps can be created from the warps of the compaction pool. Once GPU 12 finishes thread compaction of any new warps, DBM 52 releases the warps from compaction pool 156 for execution.

At the same time, the queue may continue to receive warps that are paused on any barriers after they resume on execution as described above. GPU 12 may sort the newly received warp and sort them in the queue along with the existing warps in the queue using insertion sort as described above. Once all the warps have either paused on a divergence barrier and move into the queue, or finish execution and then exit, GPU 12 detaches current first warp group from the queue to form a compaction pool, and performs compaction on the compaction pool.

Some kernel applications may require even pacing of threads executing the kernel. Kernels that are sensitive to the pace at which threads execute may also complicate the use of divergence barriers. For example when executing such a pace-sensitive kernel to which divergence barriers have been added, some warps may reach the divergence barriers and pause, while other warps may not be paused at a divergence barriers until much later in the instruction sequence of the kernel. Thus, divergence barriers may cause uneven thread and warp pacing. To even thread pacing around a first divergence barrier having a first associated Boolean condition, a programmer may insert a second divergence barrier instruction having a second associated Boolean expression that is the Boolean complement of the first Boolean condition.

The following pseudocode illustrates this technique:

```
i = 0;
while(i < dynamic limit) {
    i++;
    //to eliminate divergence
    divergence barrier(diverg conditon==true);
    // do some work
}
//warps do not hit barrier wait for those do
divergence barrier(diverg conditon==false);
// some heavy work.
```

Figure 6:
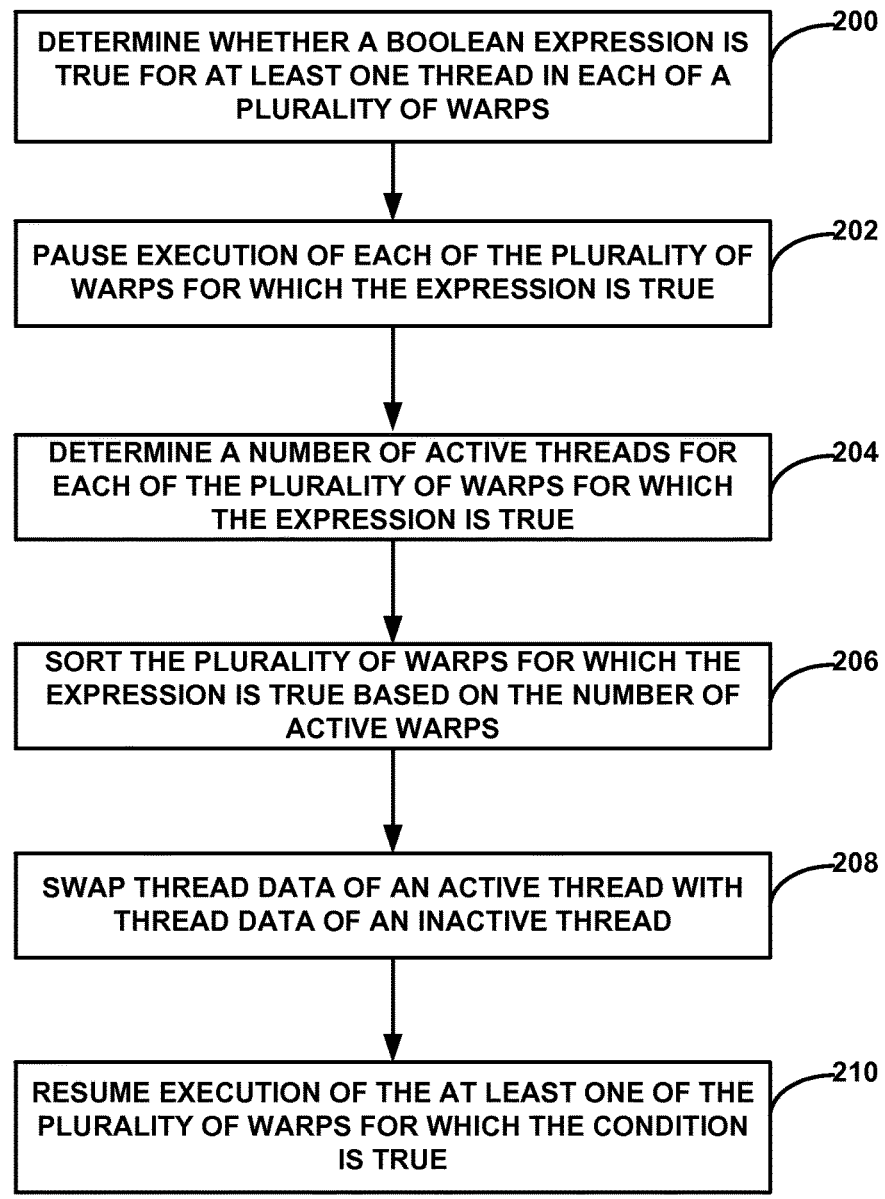
FIG. 6 is a flow diagram illustrating techniques for executing divergence barrier instructions in accordance with the techniques of this disclosure.

In the above pseudocode, GPU 12 executes a loop that includes a first divergence barrier instruction associated with a first Boolean condition. The code includes a second divergence barrier instruction outside the loop that has a second Boolean condition that is the complement of the first Boolean condition. Because the second Boolean condition is the complement of the first, GPU 12 will pause each warp at either the first or second divergence barrier instruction, thereby ensuring consistent thread pacing FIG. 6 is a flow diagram illustrating techniques for executing divergence barrier instructions in accordance with the techniques of this disclosure. GPU 12 may be configured to perform the method illustrated in FIG. 6. In some examples, GPU 12 may determine for each warp of a plurality of warps, whether a Boolean expression is true for a corresponding thread of each warp (200). GPU 12 may pause execution of each warp having a corresponding thread for which the expression is true (202), and determine a number of active threads for each of the plurality of warps for which the expression is true (204). GPU 12 may sort the plurality of warps for which the expression is true based on the number of active threads in each of the plurality of warps (206). GPU 12 may then swap thread data of an active thread of a first warp of the plurality of warps with thread data of an inactive thread of a second warp of the plurality of warps (208) and resume execution of the at least one of the plurality of warps for which the expression is true (210).

In various examples, the method of FIG. 6 may further comprise swapping per-thread context data 48 for the plurality of threads for which the expression is true before resuming execution of the at least one of the plurality of warps. The thread data of the active thread may comprise register data of the active thread, and the thread data of the inactive thread may comprise register data of the inactive thread. In some examples, sorting the plurality of warps may comprise sorting the plurality of warps using an insertion sort.

In some examples, GPU 12 may further determine, for each warp of the plurality of warps for which the expression is true, an associated divergence barrier of a plurality of divergence barriers, and group each warp of the plurality of warps into a plurality of compaction pools based on the associated divergence barrier of each warp. To sort the plurality of warps, GPU 12 may be further configured to sort the plurality of warps comprises sorting the plurality of warps belonging to a same one of the plurality of compaction pools. In various examples, the first warp and the second warp comprise warps belong to the same one of the plurality of compaction pools, and to resume execution of the at least one of the plurality of warps for which the condition is true, GPU 12 may be configured to resume execution of at least one warp of the same one compaction pool.

In some examples, GPU 12 may further assign a prefix to each of the plurality of warps based on the divergence barrier associated with each of the plurality of warps, and to group the plurality of warp into the at least one compaction pool, GPU 12 may group the plurality of warps into at least one compaction pool based on the assigned prefix.

In still other examples, GPU 12 may further determine that the plurality of warps includes a warp having all active threads; and resuming execution of the warp having all active threads. In yet another example, to sort the plurality of warps for which the expression is true, GPU 12 may be configure to store the plurality of warps in a queue, sort the plurality of warps for which the expression is true based on the number of active threads, and store the sorted plurality of warps in the queue.

In yet another example, compiler/driver 18 may be further configured to determine at least one of a location where divergence is likely to occur and a location that would significantly impact performance within kernel 20 that executes on a plurality of warps. Compiler/driver 18 may insert a divergence barrier instruction into the kernel at the at least one location. The Boolean expression of the method of FIG. 6 may be associated with the divergence barrier instruction in this example.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method for reducing divergence among threads executing on a graphics processing unit (GPU) which comprises a plurality of processing elements (PEs), the method comprising:
   initiating execution of a plurality of warps on the GPU, each warp comprising a plurality of threads with respective thread data, wherein the threads of a warp are executed in parallel on respective PEs of the GPU;
   determining, for each warp of the plurality of warps, whether a Boolean expression of a divergence barrier instruction is true for at least one thread of the warp;
   pausing execution of each warp having at least one thread for which the Boolean expression is true;

storing each warp of the plurality of warps for which execution is paused into a buffer;

sorting the warps stored in the buffer based on a number of active threads respectively in each warp stored in the buffer to produce a plurality of sorted warps stored in the buffer such that the warps stored in the buffer are sorted in descending order of number of active threads;

compacting the threads of the plurality of sorted warps, the compacting comprising:

identifying a first warp of the plurality of sorted warps having the greatest number of active threads and that is not fully active, and identifying a second warp of the plurality of sorted warps having the least number of active threads and that is not fully inactive;

swapping an inactive thread of the first warp with an active thread of the second warp, the swapping comprising swapping the respective thread data of the inactive thread and the active thread; and iteratively repeating the identifying and the swapping until no fully inactive warps can be formed from the threads of the sorted warps; and resuming execution of the plurality of sorted warps, wherein at least one thread of at least one of the resumed warps resumes execution on a PE of the GPU that is different from the PE the at least one thread was executing on prior to the pausing.

2. The method of claim 1, wherein swapping thread data comprises swapping per-thread context data.

3. The method of claim 1, wherein swapping thread data comprises swapping per-thread register data.

4. The method of claim 1, further comprising: using an insertion sort for sorting the warps stored in the buffer.

5. The method of claim 1, further comprising:

determining, for each warp for which execution is paused, an associated divergence barrier of a plurality of divergence barriers; and grouping each warp for which execution is paused into a respective compaction pool of a plurality of compaction pools based on the associated divergence barrier of each warp, wherein the sorting, compacting, and resuming is performed on a per compaction pool basis.

6. The method of claim 5, further comprising:

assigning a respective prefix to each warp for which execution is paused indicative of the divergence barrier respectively reached by each warp for which execution is paused, wherein grouping each warp stored in the buffer comprises grouping each warp stored in the buffer based on the respective prefix assigned to each warp stored in the buffer.

7. The method of claim 6, further comprising:

assigning a respective suffix to each warp for which execution is paused indicative of the number of active threads in the warp, wherein sorting the warps stored in the buffer based on the number of active threads respectively in each warp stored in the buffer comprising sorting the warps stored in the buffer based on the respective suffix assigned to each warp stored in the buffer.

8. The method of claim 1, wherein resuming execution of the plurality of sorted warps comprises resuming execution of at least one of the plurality of sorted warps which is fully active during the compacting.

9. The method of claim 1, wherein the buffer is a queue.

10. The method of claim 1, further comprising:

determining at least one location where divergence is to occur within a kernel that comprises the plurality of warps; and inserting the divergence barrier instruction into the kernel at the at least one location.

11. An apparatus for reducing divergence among threads executing on a graphics processing unit (GPU) which comprises a plurality of processing elements (PEs), the apparatus comprising:

means for initiating execution of a plurality of warps on the GPU, each warp comprising a plurality of threads with respective thread data, wherein the threads of a warp are executed in parallel on respective PEs of the GPU;

means for determining, for each warp of the plurality of warps, whether a Boolean expression of a divergence barrier instruction is true for at least one thread of the warp;

means for pausing execution of each warp having at least one thread for which the Boolean expression is true;

means for storing warp of the plurality of warps for which execution is paused into a buffer;

means for sorting the warps stored in the buffer based on a number of active threads respectively in each warp stored in the buffer to produce a plurality of sorted warps stored in the buffer such that the warps stored in the buffer are sorted in descending order of number of active threads;

means for compacting the threads of the plurality of sorted warps, the means for compacting comprising:

means for identifying a first warp of the plurality of sorted warps having the greatest number of active threads and that is not fully active, and identifying a second warp of the plurality of sorted warps having the least number of active threads and that is not fully inactive;

means for swapping an inactive thread of the first warp with an active thread of the second warp, the swapping comprising swapping the respective thread data of the inactive thread and the active thread; and means for iteratively repeating the identifying and the swapping until no fully inactive warps can be formed from the sorted warps; and means for resuming execution of the plurality of sorted warps, wherein at least one thread of at least one of the resumed warps resumes execution on a PE of the GPU that is different from the PE the at least one thread was executing on prior to the pausing.

12. The apparatus of claim 11, wherein the means for swapping thread data comprises means for swapping per-thread context data.

13. The apparatus of claim 11, wherein the buffer is a queue.

14. The apparatus of claim 11, wherein the means for swapping thread data comprises means for swapping per-thread register data.

15. The apparatus of claim 11, wherein the means for sorting the warps stored in the buffer comprises means for sorting the warps stored in the buffer using an insertion sort.

16. The apparatus of claim 11, further comprising:

means for determining, for each warp for which execution is paused, an associated divergence barrier of a plurality of divergence barriers; and means for grouping each warp for which execution is paused into a respective compaction pool of a plurality of compaction pools based on the associated divergence barrier of each warp,
wherein the sorting, compacting, and resuming is performed on a per compaction pool bass.

17. The apparatus of claim 16, further comprising:
means for assigning a respective prefix to each warp for which execution is paused indicative of the divergence barrier respectively reached by each warp for which execution is paused,
wherein the means for grouping each warp stored in the buffer comprises grouping each warp stored in the butter based on the respective prefix assigned to each warp stored in the buffer.

18. The apparatus of claim 11, wherein the means for resuming execution of the plurality of stored warps comprises means for resuming execution of at least one of the plurality of sorted warps which is fully active while fully inactive warps can still be formed from the sorted warps.

19. The apparatus of claim 17, further comprising:
means for assigning a respective suffix to each warp for which execution is paused indicative of the number of active threads in the warp, wherein the means for sorting the warps stored in the buffer based on the number of active threads respectively in each warp stored in the buffer comprises means for sorting the warps stored in the buffer based on the respective suffix assigned to each warp stored in the buffer.

20. The apparatus of claim 11, further comprising:
means for determining at east one location where divergence is to occur within a kernel that comprises the plurality of warps; and
means for inserting the divergence barrier instruction into the kernel at the at least one location.

21. A non-transitory computer-readable storage medium comprising instructions for reducing divergence among threads executing on a graphics processing unit (GPU) which comprises a plurality of processing elements (PEs), the instructions when executed, cause the GPU to:
initiate execution of a plurality of warps on the GPU, each warp comprising a plurality of threads with respective thread data, wherein the threads of a warp are executed in parallel on respective PEs of the GPU;
determine, for each warp of the plurality of warps, whether a Boolean expression of a divergence barrier instruction is true for at least one thread of the warp;
pause execution of each warp having at least one thread for which the Boolean expression is true;
store each warp of the plurality of warps for which execution is paused into a buffer;
sort the warps stored in the buffer based on a number of active threads respectively in each warp stored in the buffer to produce a plurality of sorted warps stored in the buffer such that the warps stored in the buffer are sorted in descending order of number of active threads;
compact the threads of the plurality of sorted warps via a compaction process comprising:
identifying a first warp of the plurality of sorted warps having the greatest number of active threads and that is not fully active, and identifying a second warp of the plurality of sorted warps having the least number of active threads and that is not fully inactive;
swapping an inactive thread of the first warp with an active thread of the second warp, the swapping comprising swapping the respective thread data of the inactive thread and the active thread; and
iteratively repeating the identifying and the swapping until no fully inactive warps can be formed from the sorted warps; and
resume execution of the plurality of sorted warps, wherein at least one thread of at least one of the resumed warps resumes execution on a PE of the GPU that is different from the PE the at least one thread was executing on prior to the pausing.

22. An apparatus for reducing divergence among threads executing on a graphics processing unit (GPU) which comprises a plurality of processing elements (PEs), the apparatus comprising:
a memory; and
at least one GPU configured to:
initiate execution of a plurality of warps, each warp comprising a plurality of threads with respective thread data, wherein the threads of a warp are executed in parallel on respective PEs of the GPU;
determine, for each warp of the plurality of warps, whether a Boolean expression of a divergence barrier instruction is true for at least one thread of the warp;
pause execution of each warp having at least one thread for which the Boolean expression is true;
store each warp of the plurality of warps for which execution is paused into a buffer allocated in the memory;
sort the warps stored in the buffer based on a number of active threads respectively in each warp stored in the buffer to produce a plurality of sorted warps stored in the buffer such that the warps stored in the buffer are sorted in descending order of number of active threads;
compact the threads of the plurality of sorted warps, wherein to compact the threads the at least one GPU is configured to:
identify a first warp of the plurality of sorted warps having the greatest number of active threads and that is not fully active, and identify a second warp of the plurality of sorted warps having the least number of active threads and that is not fully inactive;
swap an inactive thread of the first warp with an active thread of the second warp, the swapping comprising swapping the respective thread data of the inactive thread and the active thread; and
iteratively repeat the identifying and the swapping until no fully inactive warps can be formed from the sorted warps; and
resume execution of the plurality of sorted warps, wherein at least one thread of at least one of the resumed warps resumes execution on a PE of the GPU that is different from the PE the at least one thread was executing on prior to the pausing.

23. The apparatus of claim 22, wherein to swap thread data, the at least one GPU is configured to swap per-thread context data.

24. The apparatus of claim 22, wherein to swap thread data, the at least one GPU is configured to swap per-thread register data.

25. The apparatus of claim 22, wherein the at least one GPU is further configured to:
determine, for each warp for which execution is paused, an associated divergence barrier of a plurality of divergence barriers; and group each warp for which execution is paused into respective compaction pool of a plurality of compaction pools based on the associated divergence barrier of each warp, wherein to sort, compact, and resume the at least one GPU is configured to sort, compact, and resume on a per-compaction pool basis.

26. The apparatus of claim 25, wherein the at least one GPU is further configured to:

assign a respective prefix to each warp for which execution is paused indicative of the divergence barrier respectively reached by each warp for which execution is paused, wherein to group each warp stored in the buffer, the at least one GPU is configured to group each warp stored in the buffer based on the respective prefix assigned to each warp stored in the buffer.

27. The apparatus of claim 26, wherein the at least one GPU is further configured to:

assign a respective suffix to each warp for which execution is paused indicative of the number of active threads in the warp, wherein to sort the warps stored in the buffer based on the number of active threads respectively in each warp stored in the buffer, the at least one GPU is configured to sort the warps stored in the buffer based on the respective suffix assigned to each warp stored in the buffer.

28. The apparatus of claim 22, wherein the buffer is a queue.

* * * * *